(12) United States Patent
Taniguchi et al.

(10) Patent No.: US 11,255,560 B2
(45) Date of Patent: Feb. 22, 2022

(54) AIR-CONDITIONING APPARATUS AND METHOD OF DETERMINING OPERATION CONDITION

(71) Applicant: Mitsubishi Electric Corporation, Tokyo (JP)

(72) Inventors: Chisato Taniguchi, Tokyo (JP); Chika Tanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/050,917

(22) PCT Filed: Jun. 20, 2018

(86) PCT No.: PCT/JP2018/023464
§ 371 (c)(1),
(2) Date: Oct. 27, 2020

(87) PCT Pub. No.: WO2019/244280
PCT Pub. Date: Dec. 26, 2019

(65) Prior Publication Data
US 2021/0231332 A1 Jul. 29, 2021

(51) Int. Cl.
*F24F 11/38* (2018.01)
*F24F 11/63* (2018.01)
(Continued)

(52) U.S. Cl.
CPC .............. *F24F 11/38* (2018.01); *F24F 11/63* (2018.01); *F24F 11/79* (2018.01); *G05B 15/02* (2013.01); *F24F 11/00* (2013.01); *F24F 2110/10* (2018.01)

(58) Field of Classification Search
None
See application file for complete search history.

(56) References Cited

U.S. PATENT DOCUMENTS

| 2006/0196199 A1* | 9/2006 | Hunt, Jr. | F25D 29/00 62/132 |
| 2008/0183307 A1* | 7/2008 | Clayton | G05B 11/01 700/8 |

(Continued)

FOREIGN PATENT DOCUMENTS

| JP | H0552389 A | * | 3/1993 | F24F 11/02 |
| JP | 200646688 A | * | 2/2006 | F24F 11/02 |

(Continued)

OTHER PUBLICATIONS

International Search Report of the International Searching Authority dated Aug. 28, 2018 for the corresponding international application No. PCT/JP2018/023464 (and English translation).

*Primary Examiner* — Mohammad Ali
*Assistant Examiner* — Kelvin Booker
(74) *Attorney, Agent, or Firm* — Posz Law Group, PLC

(57) ABSTRACT

An air-conditioning apparatus includes a plurality of indoor units each individually conditioning air in an air-conditioning target space, a storage unit storing detection values of a plurality of suction temperature sensors in time series, a timer measuring, for each of the plurality of indoor units, a preset temperature arrival period it takes for a suction temperature to reach a preset temperature for the air-conditioning target space after start of a thermo-on state or a thermo-off state, a calculation unit calculating, for each of the plurality of indoor units, a temperature change slope representing a change in the suction temperature for the preset temperature arrival period, and a determination unit comparing the temperature change slope of each of the plurality of indoor units with a determination threshold to determine, as an abnormal indoor unit, the indoor unit having the temperature change slope greater than the determination threshold.

6 Claims, 12 Drawing Sheets

(51) Int. Cl.
*F24F 11/79* (2018.01)
*G05B 15/02* (2006.01)
*F24F 11/00* (2018.01)
*F24F 110/10* (2018.01)

(56) References Cited

U.S. PATENT DOCUMENTS

| | | | |
|---|---|---|---|
| 2013/0067944 A1 | 3/2013 | Kibo et al. | |
| 2016/0238268 A1 | 8/2016 | Nishimura et al. | |
| 2018/0017280 A1* | 1/2018 | Tanabe | F25B 49/027 |
| 2018/0132183 A1* | 5/2018 | Gattu | G05B 15/02 |

FOREIGN PATENT DOCUMENTS

| | | | | |
|---|---|---|---|---|
| JP | 20088558 A | * | 1/2008 | F25D 13/00 |
| JP | 2009210140 A | * | 9/2009 | F24F 11/02 |
| JP | 2011-257126 A | | 12/2011 | |
| JP | 5308040 B2 | * | 10/2013 | F24F 11/02 |
| JP | 2015-068591 A | | 4/2015 | |

* cited by examiner

AIR-CONDITIONING APPARATUS AND METHOD OF DETERMINING OPERATION CONDITION

CROSS REFERENCE TO RELATED APPLICATION

This application is a U.S. national stage application of International Application No. PCT/JP2018/023464, filed on Jun. 20, 2018, the contents of which are incorporated herein by reference.

TECHNICAL FIELD

The present disclosure relates to an air-conditioning apparatus including a plurality of indoor units conditioning air in the same air-conditioning target space and an operation condition determining method that is performed by the air-conditioning apparatus.

BACKGROUND

A typical air-conditioning apparatus individually controls a plurality of indoor units such that the indoor units each individually perform air-conditioning. In a cooling mode and a heating mode, whether to start a thermo-on state or a thermo-off state is determined for each of the indoor units on the basis of the difference between a suction temperature of the indoor unit and a preset temperature. In an operation mode that is automatically switched between the cooling mode and the heating mode, the air-conditioning apparatus also individually controls the indoor units such that the operation mode of each indoor unit is individually switched from, for example, the cooling mode to the heating mode.

An air-conditioning apparatus known in the art is configured such that a plurality of indoor units conditioning air in the same indoor space are simultaneously switched between the thermo-on state and the thermo-off state (refer to, for example, Patent Literature 1). In the air-conditioning apparatus disclosed in Patent Literature 1, the indoor units are controlled based on a common representative temperature-related value rather than suction temperatures of the indoor units, thereby collectively switching the indoor units between the thermo-on state and the thermo-off state.

PATENT LITERATURE

Patent Literature 1: Japanese Unexamined Patent Application Publication No. 2011-257126

The air-conditioning apparatus disclosed in Patent Literature 1 is effectively used under conditions where the number of indoor units performing an abnormal operation that is not based on an actual indoor temperature is small while a large number of indoor units each perform a normal operation based on the actual indoor temperature. However, this apparatus is not effectively used under conditions where a large number of indoor units perform incorrect operations.

For example, if the representative temperature-related value is set based on an indoor unit of the indoor units that sucks air blown by itself, the apparatus will fail to perform air-conditioning suitable for an actual indoor temperature environment. Furthermore, if each of two adjacent indoor units sucks air blown by the other indoor unit and the representative temperature-related value is set based on one of these indoor units, the apparatus will also fail to perform air-conditioning suitable for the actual indoor temperature environment.

SUMMARY

The present disclosure has been made to overcome the above-described problem and aims to provide an air-conditioning apparatus that determines an indoor unit performing an abnormal operation and a method of determining an operation condition.

An air-conditioning apparatus according to an embodiment of the present disclosure includes: a plurality of indoor units each including a suction temperature sensor detecting a suction temperature that is a temperature of air sucked from an air-conditioning target space into the indoor unit, in which the suction temperature sensor is included, the plurality of indoor units each individually conditioning the air in the air-conditioning target space by using the suction temperature and a preset temperature; a storage unit storing detection values of the suction temperature sensors in time series; a timer measuring, for each of the plurality of indoor units, a preset temperature arrival period it takes for the suction temperature to reach the preset temperature for the air-conditioning target space after start of a thermo-on state or a thermo-off state; a calculation unit calculating, for each of the plurality of indoor units, a temperature change slope representing a change in the suction temperature for the preset temperature arrival period; and a determination unit comparing the temperature change slope of each of the plurality of indoor units with a determination threshold to determine, as an abnormal indoor unit, the indoor unit having the temperature change slope greater than the determination threshold.

An operation condition determining method according to an embodiment of the present disclosure is an operation condition determining method that is performed by an air-conditioning apparatus including a plurality of indoor units and a storage unit, the plurality of indoor units each including a suction temperature sensor detecting a suction temperature that is a temperature of air sucked from an air-conditioning target space into the indoor unit, in which the suction temperature sensor is included, of the plurality of indoor units, the plurality of indoor units each individually conditioning the air in the air-conditioning target space by using the suction temperature and a preset temperature. The method includes: a step of storing detection values of the suction temperature sensors in time series in the storage unit; a step of measuring, for each of the plurality of indoor units, a preset temperature arrival period it takes for the suction temperature to reach the preset temperature for the air-conditioning target space after start of a thermo-on state or a thermo-off state; a step of calculating, for each of the plurality of indoor units, a temperature change slope representing a change in the suction temperature for the preset temperature arrival period; and a step of comparing the temperature change slope of each of the plurality of indoor units with a determination threshold to determine, as an abnormal indoor unit, the indoor unit having the temperature change slope greater than the determination threshold.

According to the embodiments of the present disclosure, an abnormal indoor unit in an abnormal operation condition can be determined out of the plurality of indoor units by comparing the temperature change slopes calculated for the respective indoor units with the determination threshold.

DETAILED DESCRIPTION

Embodiment 1

Figure 1:
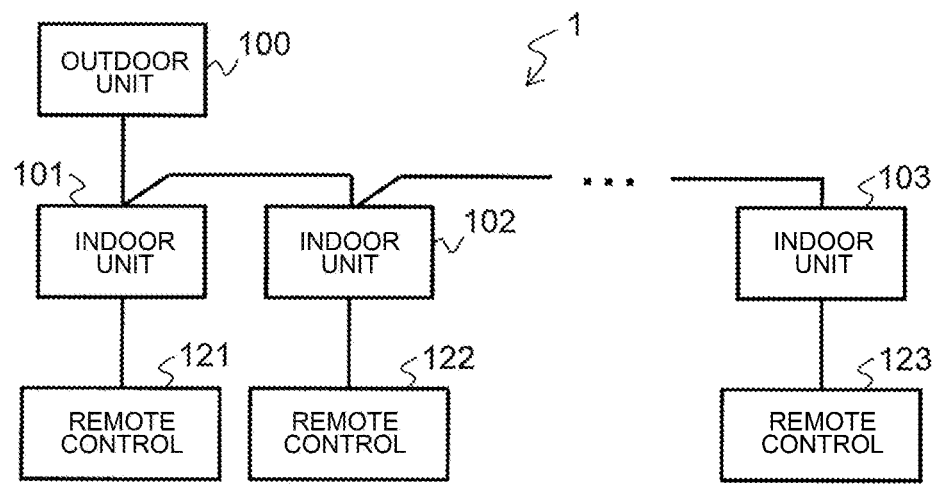
FIG. 1 is a block diagram illustrating an exemplary configuration of an air-conditioning apparatus according to Embodiment 1 of the present disclosure.

The configuration of an air-conditioning apparatus according to Embodiment 1 will be described. FIG. 1 is a diagram illustrating an exemplary configuration of the air-conditioning apparatus according to Embodiment 1 of the present disclosure. An air-conditioning apparatus 1 includes an outdoor unit 100 and a plurality of indoor units 101 to 103. The indoor units 101 to 103 condition air in the same room, serving as a single air-conditioning target space. With the indoor unit 101 is connected a remote control 121, through which a user inputs an operation mode and a preset temperature for an indoor space. Like the indoor unit 101, the indoor unit 102 is connected to a remote control 122 and the indoor unit 103 is connected to a remote control 123. Although it is assumed in Embodiment 1 that the three indoor units 101 to 103 are connected to the single outdoor unit 100 as illustrated in FIG. 1, the number of indoor units is not limited.

Figure 2:
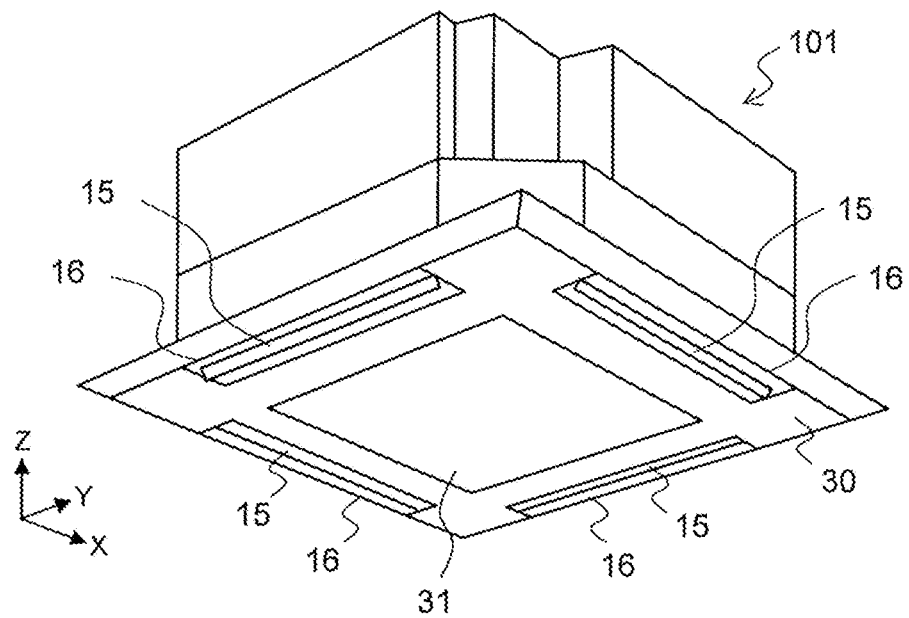
FIG. 2 is a perspective view of an exemplary configuration of an indoor unit illustrated in FIG. 1.

It is assumed in Embodiment 1 that the indoor units 101 to 103 are indoor units of a four-way ceiling cassette type. FIG. 2 is a perspective view of an exemplary configuration of the indoor unit in FIG. 1. Since the indoor units 101 to 103 have the same configuration, the configuration of the indoor unit 101 will now be described with reference to FIG. 2.

The indoor unit 101 is installed in the ceiling of the room such that a lower surface 30 illustrated in FIG. 2 is exposed at the ceiling to the indoor space. The lower surface 30 has an air inlet 31 and four air outlets 16. Each of the air outlets 16 has an air flow direction adjusting unit 15 to adjust an air flow direction in which air is blown from the indoor unit 101. Although the indoor unit 101 includes the four air outlets 16 in the exemplary configuration of FIG. 2, the number of air outlets 16 is not limited to four. The indoor unit may include two air outlets 16. Other configurations are applicable as long as the indoor unit include at least one air outlet.

Figure 3:
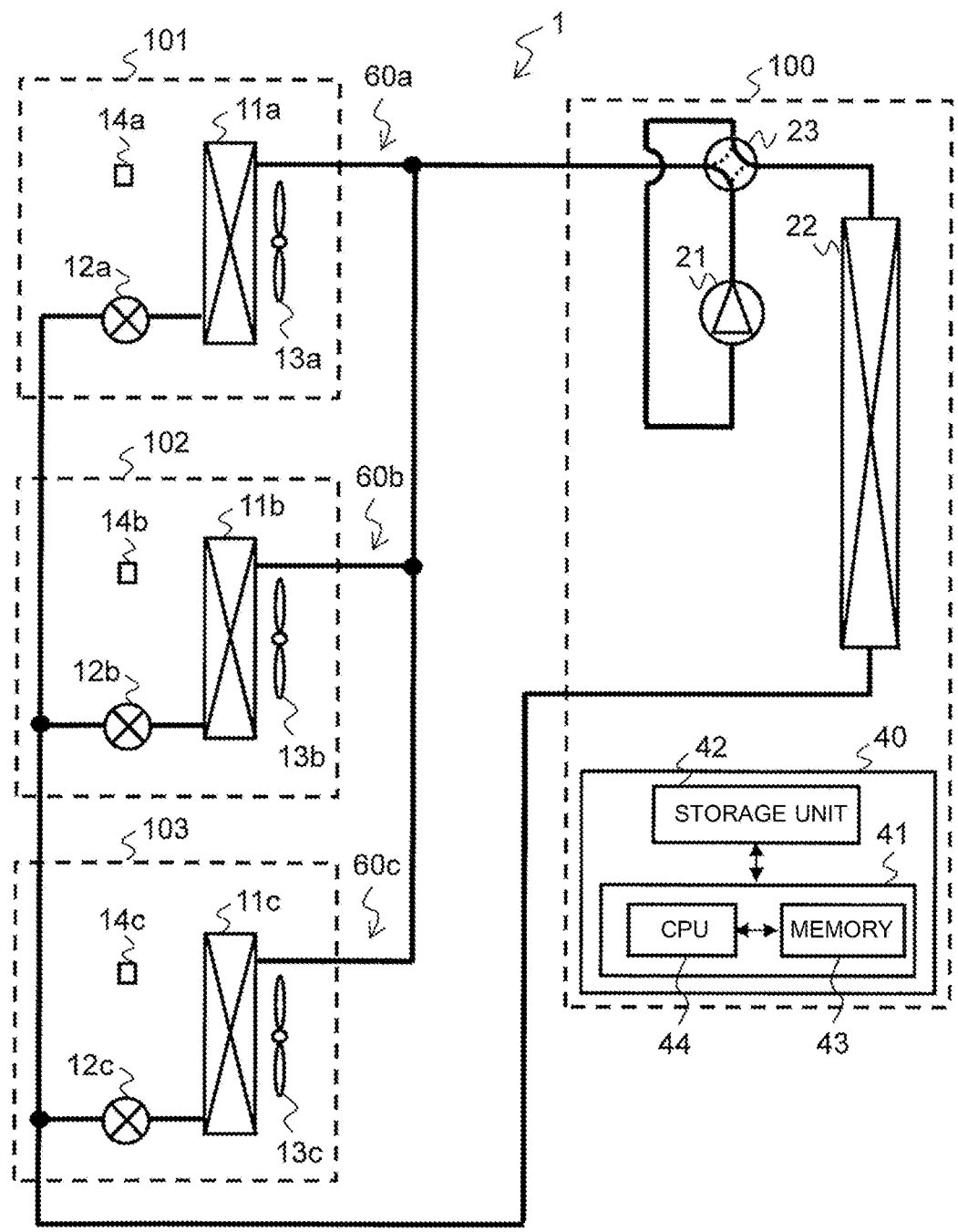
FIG. 3 is a diagram illustrating refrigerant circuits of the air-conditioning apparatus of FIG. 1.

FIG. 3 is a diagram illustrating refrigerant circuits of the air-conditioning apparatus of FIG. 1. The outdoor unit 100 includes a compressor 21, a heat source side heat exchanger 22, and a flow switching device 23. The compressor 21 compresses and discharges refrigerant. The compressor 21 is, for example, a compressor including an inverter circuit that changes a rotation speed. The heat source side heat exchanger 22 is a heat exchanger exchanging heat between the refrigerant and outdoor air. The heat source side heat exchanger 22 is, for example, a fin-tube heat exchanger. The flow switching device 23 switches between refrigerant flow directions depending on an operation mode of the air-conditioning apparatus 1. The flow switching device 23 is, for example, a four-way valve.

The indoor unit 101 includes a load side heat exchanger 11a, an expansion device 12a, a fan 13a, and a suction temperature sensor 14a. The load side heat exchanger 11a is a heat exchanger exchanging heat between the refrigerant and indoor air. The load side heat exchanger 11a is, for example, a fin-tube heat exchanger. The expansion device 12a reduces the pressure of the refrigerant to expand the refrigerant. The expansion device 12a is, for example, an electronic expansion valve. The fan 13a sucks the air from the indoor space and supplies the air to the load side heat exchanger 11a. Furthermore, the fan 13a sends air, subjected to heat exchange with the refrigerant in the load side heat exchanger 11a, into the indoor space. The suction temperature sensor 14a detects a suction temperature Tvra, which is the temperature of the air sucked into the indoor unit 101 from the indoor space.

The indoor unit 102 includes a load side heat exchanger 11b, an expansion device 12b, a fan 13b, and a suction temperature sensor 14b. The indoor unit 103 includes a load side heat exchanger 11c, an expansion device 12c, a fan 13c, and a suction temperature sensor 14c. Each of the load side heat exchangers 11b and 11c, the expansion devices 12b and 12c, the fans 13b and 13c, and the suction temperature sensors 14b and 14c has the same configuration as that of the corresponding device in the indoor unit 101 described above, and a detailed description thereof is omitted. The suction temperature sensor 14b detects a suction temperature Tvrb, and the suction temperature sensor 14c detects a suction temperature Tvrc. Each of the suction temperatures Tvra to Tvrc will be referred to as a suction temperature Tvr hereinafter.

The compressor 21, the heat source side heat exchanger 22, the expansion device 12a, and the load side heat exchanger 11a are connected by refrigerant pipes, thus forming a refrigerant circuit 60a through which the refrigerant is circulated. The compressor 21, the heat source side heat exchanger 22, the expansion device 12b, and the load side heat exchanger 11b are connected by the refrigerant pipes, thus forming a refrigerant circuit 60b through which the refrigerant is circulated. The compressor 21, the heat source side heat exchanger 22, the expansion device 12c, and the load side heat exchanger 11c are connected by the refrigerant pipes, thus forming a refrigerant circuit 60c through which the refrigerant is circulated.

Figure 4:
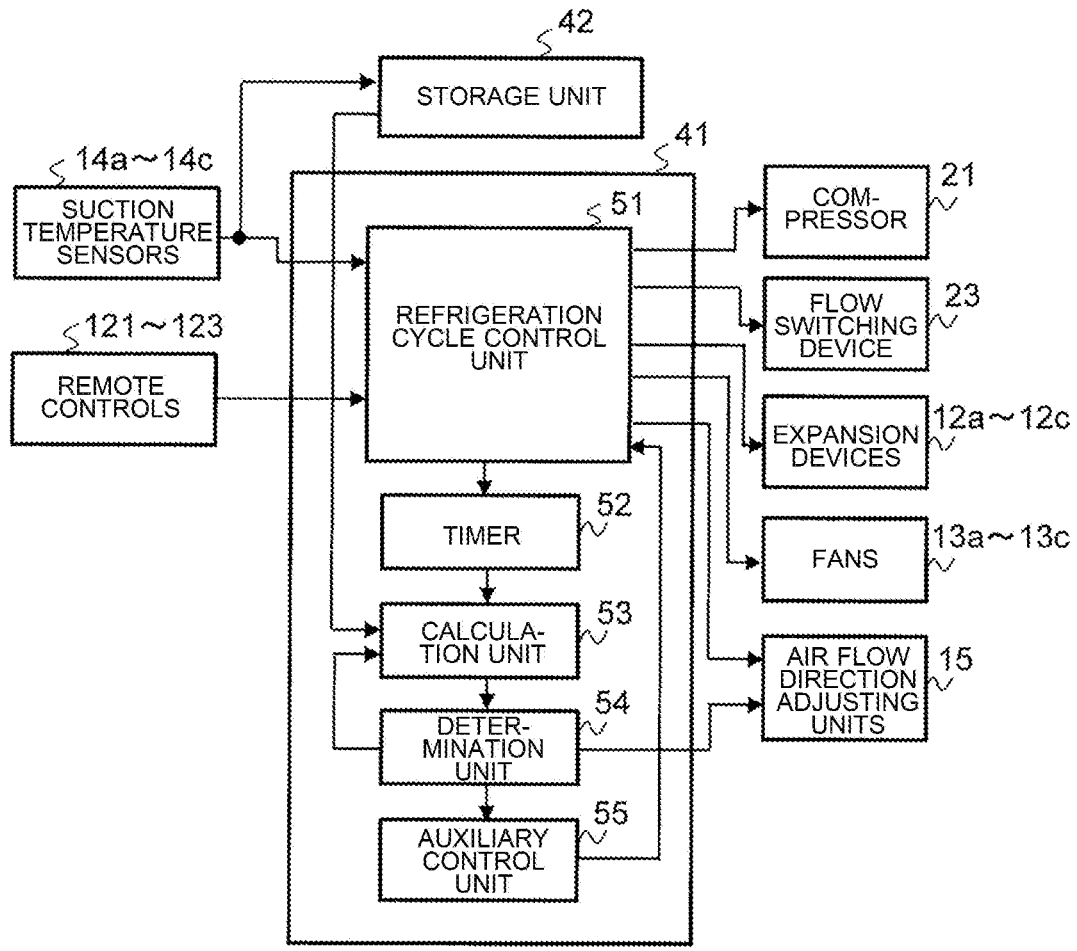
FIG. 4 is a block diagram illustrating an exemplary configuration of a controller illustrated in FIG. 3.

The configuration of a controller 40 will now be described. FIG. 4 is a block diagram illustrating an exemplary configuration of the controller in FIG. 3. As illustrated in FIG. 3, a controller 40 includes a control unit 41 and a storage unit 42. The control unit 41 includes a memory 43 storing a program and a central processing unit (CPU) 44 executing a process based on the program. The storage unit 42 stores detection values of the suction temperature sensors 14a to 14c in time series. Specifically, the storage unit 42 stores each of the detection values of the suction temperature sensors 14a to 14c in association with a point of time at which the detection value is obtained. The memory 43 and the storage unit 42 are, for example, nonvolatile memories, such as flash memories.

As illustrated in FIG. 4, the control unit 41 includes a refrigeration cycle control unit 51, a timer 52, a calculation unit 53, a determination unit 54, and an auxiliary control unit 55. The CPU 44 executes the program, thus causing the refrigeration cycle control unit 51, the timer 52, the calculation unit 53, the determination unit 54, and the auxiliary control unit 55 to be included in the air-conditioning apparatus 1. The remote controls 121 to 123 in FIG. 1 are connected to the controller 40 by signal links. An operation mode and a preset temperature Tset are input to the control unit 41 through the remote controls 121 to 123. The remote controls 121 to 123 may transmit and receive operation information to and from each other via the controller 40. The preset temperature Tset, which is input through the remote controls 121 to 123, may differ from one indoor unit to another. For the convenience of description, it is assumed in the following description that the preset temperature Tset is the same in the indoor units 101 to 103.

The refrigeration cycle control unit 51 performs air-conditioning control for each of the indoor units 101 to 103 on the basis of detection values input from the suction temperature sensors 14a to 14c and the preset temperature Tset. Specifically, the refrigeration cycle control unit 51 controls the rotation speed of the compressor 21 and the opening degree of each of the expansion devices 12a to 12c during thermo-on. The refrigeration cycle control unit 51 stops the operation of the compressor 21 when a thermo-off state starts. The term "thermo-on state" as used herein refers to a state in which a heating operation or a cooling operation is performed based on an operation mode until the suction temperature Tvr, serving as an indoor temperature Tr, reaches the preset temperature Tset. The term "thermo-off state" as used herein refers to a state in which the heating operation and the cooling operation are stopped when the suction temperature Tvr, serving as the indoor temperature Tr, reaches the preset temperature Tset. As described above, the indoor units 101 to 103 each individually operate under control of the refrigeration cycle control unit 51.

Once the thermo-off state starts, the refrigeration cycle control unit 51 prevents start of the thermo-on state for a predetermined protection period to protect the compressor 21. The protection period is, for example, three minutes. The refrigeration cycle control unit 51 stops the compressor 21 in response to an instruction to stop an air-conditioning operation given by a user operating any of the remote controls 121 to 123. In this case, the refrigeration cycle control unit 51 does not also actuate the compressor 21 unless the protection period elapses.

The timer 52 measures preset temperature arrival periods tpa to tpc, each of which is the time it takes for the suction temperature Tvr to reach the preset temperature Tset for the indoor space after start of the thermo-on state or the thermo-off state, for the indoor units 101 to 103. The calculation unit 53 calculates temperature change slopes KTa to KTc representing changes in suction temperature for the preset temperature arrival periods tpa to tpc measured by the timer 52. The determination unit 54 compares the temperature change slopes KTa to KTc, calculated by the calculation unit 53, with a determination threshold KTth to determine that the indoor unit having a temperature change slope greater than the determination threshold is in an abnormal operation condition. The indoor unit determined as being in the abnormal operation condition will be referred to as an abnormal indoor unit hereinafter. Each of the preset temperature arrival periods tpa to tpc will be referred to as a preset temperature arrival period tp. Each of the temperature change slopes KTa to KTc will be referred to as a temperature change slope KT.

When the determination unit 54 determines that there is an abnormal indoor unit, the auxiliary control unit 55 designates, as a parent unit, one of the indoor units 101 to 103 other than the indoor unit determined as the abnormal indoor unit. The auxiliary control unit 55 designates, as child units, the remaining indoor units other than the parent unit, and instructs the refrigeration cycle control unit 51 to control the operations of all of the indoor units on the basis of the suction temperature Tvr of the parent unit. Specifically, the auxiliary control unit 55 controls the thermo-on state and the thermo-off state on the basis of the suction temperature Tvr of the parent unit. The user may set a preference as to whether to perform parent unit control, in which the operations of all of the indoor units are controlled based on the suction temperature Tvr of the parent unit, or continue individual operations of the indoor units in the case of a determination that there is an abnormal indoor unit by using the remote controls 121 to 123.

In FIG. 3, the storage unit 42 and the memory 43 are illustrated as separate components. The storage unit 42 and the memory 43 may be integrated into a single component.

The flow of the refrigerant through the refrigerant circuits 60a to 60c in FIG. 3 in a case where the indoor units 101 to 103 operate in the cooling mode will now be described. First, the flow of the refrigerant under conditions where all of the indoor units 101 to 103 operate in the cooling mode will be described.

The refrigeration cycle control unit 51 causes the flow switching device 23 to switch between passages such that the refrigerant discharged from the compressor 21 flows into the heat source side heat exchanger 22. Low temperature, low pressure refrigerant is compressed into high temperature, high pressure gas refrigerant by the compressor 21, and the gas refrigerant is discharged from the compressor 21. The gas refrigerant discharged from the compressor 21 passes through the flow switching device 23 and flows into the heat source side heat exchanger 22. The refrigerant flowing through the heat source side heat exchanger 22 exchanges heat with outdoor air in the heat source side heat exchanger 22 and thus condenses into low temperature, high pressure liquid refrigerant. The liquid refrigerant flows out of the outdoor unit 100.

The liquid refrigerant leaving the outdoor unit 100 is turned into low temperature, low pressure liquid refrigerant by the expansion devices 12a to 12c. The liquid refrigerant flows into the load side heat exchangers 11a to 11c. The refrigerant flowing through the load side heat exchangers 11a to 11c exchanges heat with indoor air in the load side heat exchangers 11a to 11c and thus evaporates into low temperature, low pressure gas refrigerant. In the load side heat exchangers 11a to 11c, the refrigerant receives heat from the indoor air, thus cooling the indoor air. The refrigerant leaving the load side heat exchangers 11a to 11c passes through the flow switching device 23 and is then sucked into the compressor 21. While the air-conditioning apparatus 1 is performing the cooling operation, a cycle in which the refrigerant discharged from the compressor 21 sequentially flows through the heat source side heat exchanger 22, the expansion devices 12a to 12c, and the load side heat exchangers 11a to 11c and is then sucked into the compressor 21 is repeated.

The flow of the refrigerant under conditions where all of the indoor units 101 to 103 operate in a heating mode will now be described. The refrigeration cycle control unit 51 causes the flow switching device 23 to switch between the passages such that the refrigerant discharged from the compressor 21 flows into the load side heat exchangers 11a to 11c. High temperature, high pressure gas refrigerant discharged from the compressor 21 passes through the flow switching device 23 and flows into the load side heat exchangers 11a to 11c. The refrigerant flowing through the load side heat exchangers 11a to 11c exchanges heat with the indoor air in the load side heat exchangers 11a to 11c and thus condenses into high temperature, high pressure liquid refrigerant. In the load side heat exchangers 11a to 11c, the refrigerant transfers heat to the indoor air, thus heating the indoor air.

The high temperature, high pressure liquid refrigerant leaving the load side heat exchangers 11a to 11c is turned into low temperature, low pressure liquid refrigerant by the expansion devices 12a to 12c. The liquid refrigerant flows into the heat source side heat exchanger 22. The refrigerant flowing through the heat source side heat exchanger 22 exchanges heat with the outdoor air in the heat source side heat exchanger 22 and thus evaporates into low temperature, low pressure gas refrigerant. The refrigerant flows out of the heat source side heat exchanger 22, passes through the flow switching device 23, and is then sucked into the compressor 21. While the air-conditioning apparatus 1 is performing the heating operation, a cycle in which the refrigerant discharged from the compressor 21 sequentially flows through the load side heat exchangers 11a to 11c, the expansion devices 12a to 12c, and the heat source side heat exchanger 22 and is then sucked into the compressor 21 is repeated.

Figure 5:
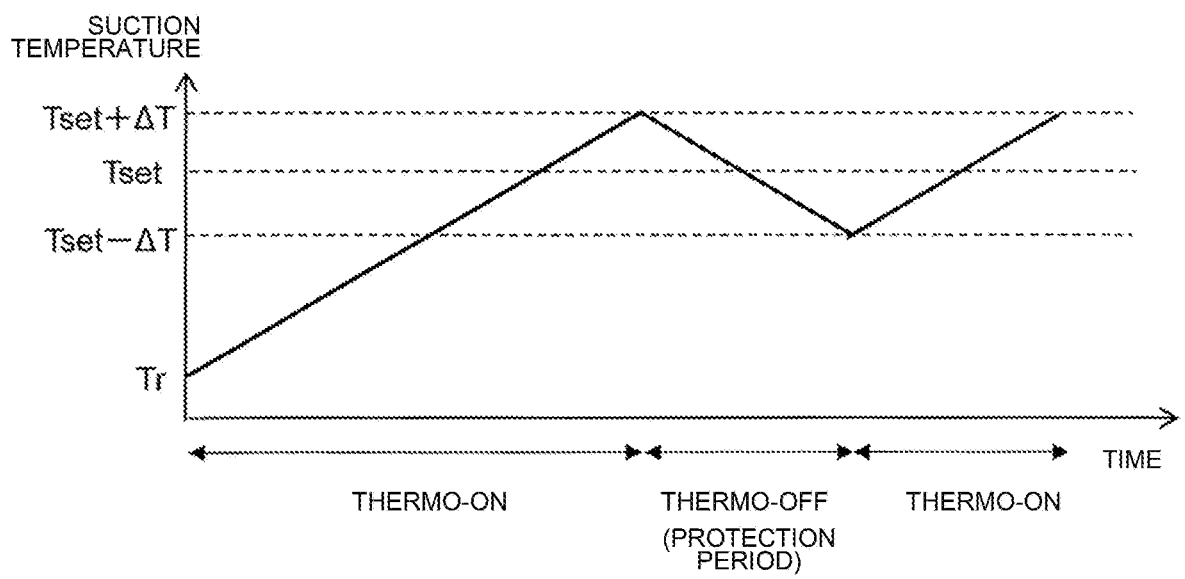
FIG. 5 is a graph showing the relationship between time and a suction temperature of an indoor unit appropriately operating in a temperature environment in which an indoor temperature is lower than a preset temperature in Embodiment 1 of the present disclosure.

The relationship between an elapsed time and the suction temperature after start of the thermo-on state in the heating operation in an air-conditioning environment where the indoor temperature Tr is lower than the preset temperature Tset will now be described. FIG. 5 is a graph showing the relationship between the time and the suction temperature of the indoor unit appropriately operating in a temperature environment in which the indoor temperature is lower than the preset temperature in Embodiment 1 of the present disclosure. As long as the indoor units 101 to 103 are appropriately arranged, as illustrated in FIG. 5, the suction temperature Tvr will gradually increase during the thermo-on state and gradually decrease upon start of the thermo-off state. Appropriate arrangement of the indoor units 101 to 103 will be described later.

For determination, by the refrigeration cycle control unit 51, as to switching between the thermo-on state and the thermo-off state in the heating operation, the thermo-on state starts when the suction temperature Tvr is lower than the preset temperature Tset, and the thermo-off state starts when the suction temperature Tvr is higher than the preset temperature. As illustrated in FIG. 5, a differential of $\pm\Delta T$ may be provided for the preset temperature Tset. Hereinafter, a value Tset+$\Delta T$ will be referred to as an upper preset temperature and a value Tset−$\Delta T$ will be referred to as a lower preset temperature.

Examples of operation conditions where any of the indoor units 101 to 103 in FIG. 1 performs an abnormal operation will now be described. Two different operation conditions D1 and D2 will be described below.

Figure 6:
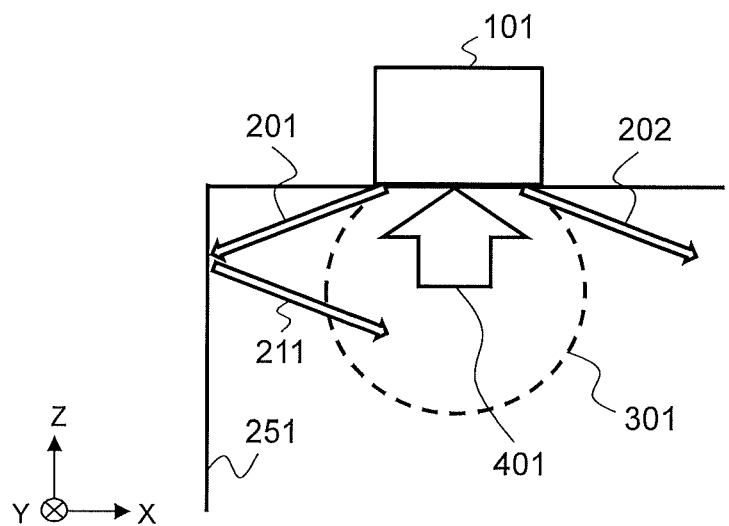
FIG. 6 is a diagram schematically illustrating air to be sucked into an indoor unit, which is installed close to a wall and is included in the indoor units illustrated in FIG. 1, and streams of air blown from the indoor unit.

The operation condition D1 is a condition where one indoor unit installed close to a wall sucks air blown by itself and operates incorrectly. FIG. 6 is a diagram explaining an example of the operation condition D1. FIG. 6 schematically illustrates the air to be sucked into one of the indoor units in FIG. 1 that is installed close to the wall and streams of air blown from the indoor unit.

The indoor unit 101 blows the air represented as streams 201 and 202. In a case where the indoor unit 101 is installed close to a wall 251 as illustrated in FIG. 6, the air stream 201 blown in a direction to the wall (or direction opposite to that of an X-axis arrow) by the indoor unit 101 is reflected by the wall 251, and the reflected air stream, 211, heats the air in a region 301. The indoor unit 101 sucks the air, as represented by an arrow 401, in the region 301 and incorrectly detects, as an indoor temperature, the temperature of the air blown by itself.

Figure 7:
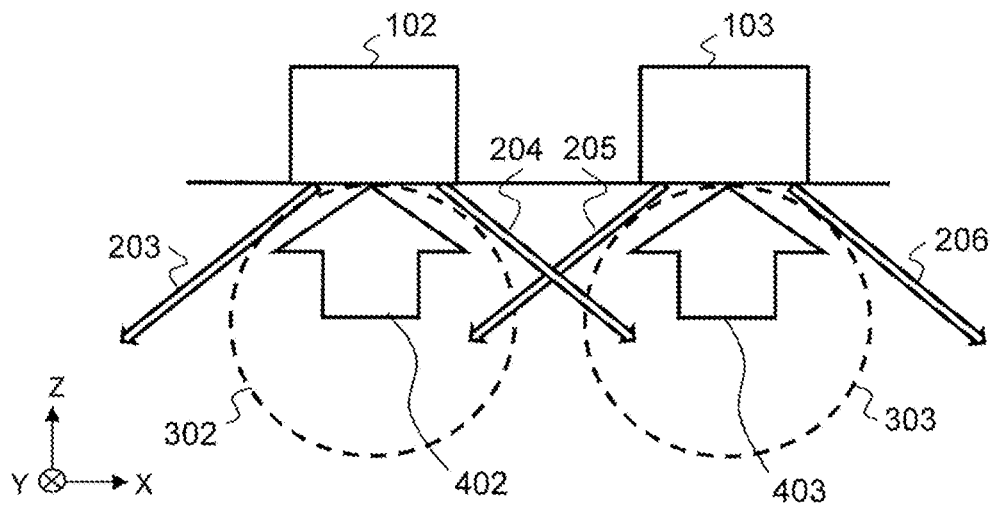
FIG. 7 is a diagram schematically illustrating air to be sucked into two indoor units, which are arranged close to each other and are included in the indoor units in FIG. 1, and streams of air blown from the two indoor units interfering with each other in air-conditioning.

The operation condition D2 will now be described. The operation condition D2 is a condition where each of two indoor units installed close to each other sucks air blown by the other indoor unit such that the two indoor units interfere with each other in air-conditioning. FIG. 7 is a diagram explaining an example of the operation condition D2. FIG. 7 schematically illustrates the air to be sucked into two indoor units, which are arranged close to each other and are included in the indoor units in FIG. 1, and streams of air blown from the two indoor units interfering with each other in air-conditioning. It is assumed herein that the indoor units 102 and 103 are installed close to each other.

The indoor temperature Tr is low, the indoor units 102 and 103 start the heating operation, and the indoor units 102 and 103 enter the thermo-on state. The indoor unit 102 blows the air represented as streams 203 and 204. The indoor unit 103 blows the air represented as streams 205 and 206. The indoor unit 102 sucks the air, as represented by an arrow 402, in a region 302 heated by the air stream 205 blown by the indoor unit 103. Like the indoor unit 102, the indoor unit 103 sucks the air, as represented by an arrow 403, in a region 303 heated by the air stream 204 blown by the indoor unit 102.

In this case, the indoor units 102 and 103 enter the thermo-off state because each suction temperature Tvr exceeds the preset temperature Tset even if a temperature in a region occupied by the user does not reach the preset temperature Tset.

After the two indoor units 102 and 103 enter the thermo-off state, a temperature in each of the regions 302 and 303 decreases in a short time because the region occupied by the user has a low temperature. The suction temperature Tvr in each indoor unit immediately falls below the preset temperature Tset, so that the indoor units 102 and 103 again enter the thermo-on state. Upon entering the thermo-on state, each of the indoor units 102 and 103 sucks a stream of warm air blown by the other indoor unit and again enters the thermo-off state. Such an operation condition is repeated. This results in inefficient air-conditioning in the indoor space. In the operation condition D2, each of the two indoor units installed close to each other sucks the air blown by the other indoor unit and the two indoor units simultaneously switch between the thermo-on state and the thermo-off state. Such a phenomenon, in which two adjacent indoor units affect each other, may also occur under conditions where the indoor temperature is high and the cooling operation is performed.

Figure 8:
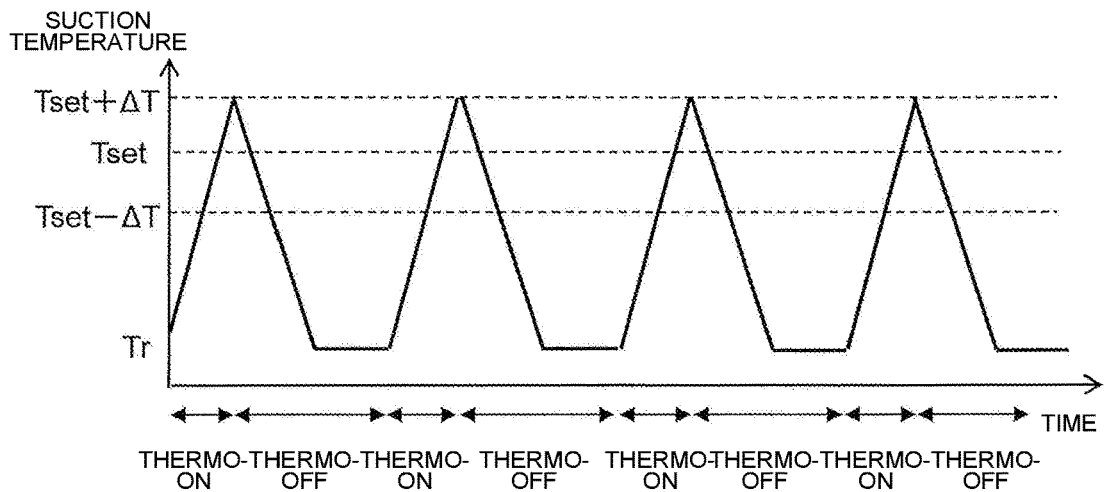
FIG. 8 is a graph showing the relationship between the time and the suction temperature in operation conditions illustrated in FIGS. 6 and 7.

FIG. 8 is a graph showing the relationship between the time and the suction temperature in the operation conditions illustrated in FIGS. 6 and 7. Referring to FIG. 8, the relationship between the time and the suction temperature in the heating mode is depicted such that the suction temperature sharply increases upon start of the thermo-on state and sharply decreases upon start of the thermo-off state. Switching between the thermo-on state and the thermo-off state is repeated in a short time.

As described above with reference to FIGS. 6 and 7, one or some of the indoor units arranged in the same air-conditioning target space may be affected by the temperature of air blown by itself or the other indoor units. This is caused by, for example, inappropriate arrangement of the indoor units 101 to 103 in installing the air-conditioning apparatus 1.

In an automatic cooling/heating switching mode, when one of two indoor units in the thermo-on state sucks cold air blown by the other indoor unit, the operation mode is switched to an automatic heating mode. After the operation mode is switched to the automatic heating mode, one of the two indoor units sucks warm air blown by the other indoor unit, so that the operation mode is automatically switched to an automatic cooling mode. Automatic switching between the operation modes is repeated, causing an operation that is not suitable for an actual indoor temperature. An air-conditioning apparatus known in the art performs air-conditioning control based on a detection value of a sensor included in a remote control rather than of a sensor disposed in an indoor unit. If the remote control is placed in a region occupied by a user, appropriate air-conditioning can be performed. However, if a plurality of remote controls for a plurality of indoor units are collectively arranged on, for example, a wall of an indoor space, such as an office in a building, the problems of the operation conditions D1 and D2 remain unsolved.

If switching between the thermo-on state and the thermo-off state is inappropriately repeated irrespective of the actual indoor temperature Tr, or alternatively, if the operation mode is frequently switched between the automatic cooling mode and the automatic heating mode, this switching leads to a distinctive relationship between the time and the suction temperature Tvr as illustrated in FIG. 8. As described above, the reason is that the indoor unit sucks air blown by itself or another indoor unit and performs an inappropriate operation that is not suitable for the actual indoor temperature Tr.

Figure 9:
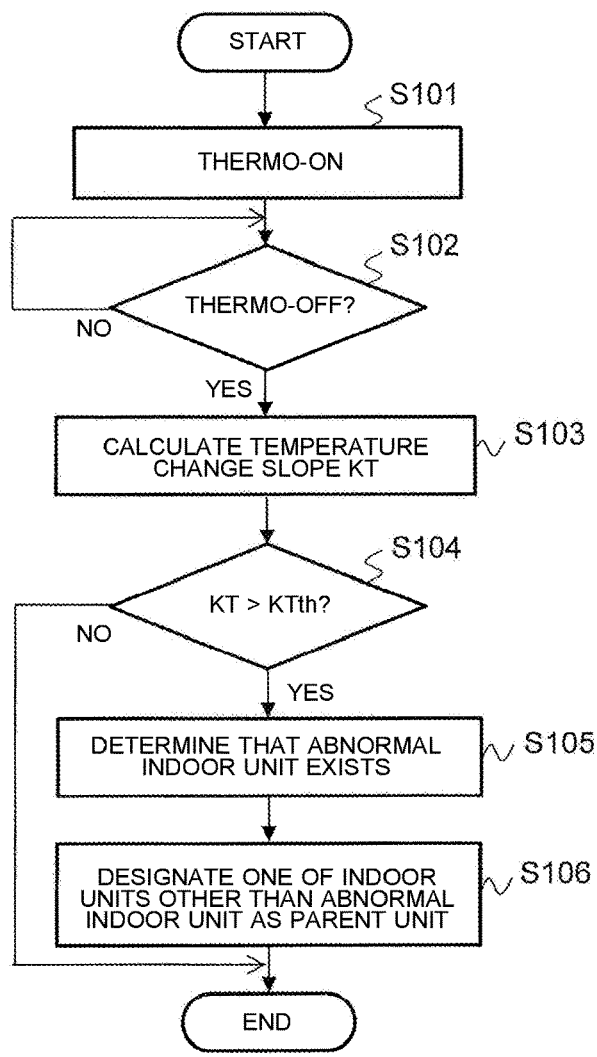
FIG. 9 is a flowchart illustrating an operation procedure of the air-conditioning apparatus according to Embodiment 1 of the present disclosure.

An operation procedure of the air-conditioning apparatus 1 according to Embodiment 1 in the above-described operation conditions D1 and D2 will now be described. FIG. 9 is a flowchart illustrating the operation procedure of the air-conditioning apparatus according to Embodiment 1 of the present disclosure. It is assumed herein that the indoor temperature Tr is lower than the preset temperature Tset and the refrigeration cycle control unit 51 performs the heating operation.

When the refrigeration cycle control unit 51 starts the thermo-on state (step S101), the storage unit 42 stores the suction temperature Tvr detected by each of the suction temperature sensors 14a to 14c in time series. Furthermore, the timer 52 measures a preset temperature arrival period it takes for the suction temperature Tvr to reach the preset temperature Tset after start of the thermo-on state. When the refrigeration cycle control unit 51 starts the thermo-off state (step S102), the calculation unit 53 calculates, for each of the indoor units 101 to 103, a temperature change slope KT for the preset temperature arrival period tp measured by the timer 52 (step S103).

Then, the determination unit 54 compares the temperature change slope KT, calculated by the calculation unit 53 for each of the indoor units 101 to 103, with the determination threshold KTth (step S104). If there is an indoor unit having the temperature change slope KT greater than the determination threshold KTth, the determination unit 54 determines that the indoor unit having the temperature change slope KT greater than the determination threshold KTth is an abnormal indoor unit (step S105). If each of the three temperature change slopes KT is less than or equal to the determination threshold KTth, the determination unit 54 determines that there is no indoor unit in an abnormal operation condition. In this case, the determination unit 54 may instruct the refrigeration cycle control unit 51 to continue the individual operations of the indoor units 101 to 103.

If the determination unit 54 determines in step S105 that there is an abnormal indoor unit, the auxiliary control unit 55 designates, as a parent unit, one of the indoor units 101 to 103 other than the indoor unit determined as an abnormal indoor unit (step S106). Then, the auxiliary control unit 55 designates, as child units, the remaining indoor units other than the parent unit, and instructs the refrigeration cycle control unit 51 to control the operations of all of the indoor units on the basis of the suction temperature Tvr of the parent unit. In this case, the suction temperature Tvr of the parent unit is close to the actual indoor temperature Tr and the abnormal indoor unit performs the heating operation based on the suction temperature Tvr of the parent unit. Therefore, air-conditioning can be appropriately performed in any of the operation conditions D1 and D2.

In the above description, the thermo-on state is started in step S101. The thermo-off state may be started in step S101. If the thermo-off state is started in step S101, the storage unit 42 may store the suction temperatures Tvr in time series until the thermo-on state is started.

Furthermore, in step S106 in FIG. 9, the auxiliary control unit 55 may designate an indoor unit having the lowest suction temperature Tvr in the heating operation as a parent unit and may designate an indoor unit having the highest suction temperature Tvr in the cooling operation as a parent unit. If multiple indoor units are candidates for the parent unit, for example, the auxiliary control unit 55 may designate, as the parent unit, an indoor unit assigned the smallest address number of address numbers assigned as identifiers to the indoor units.

Figure 10:
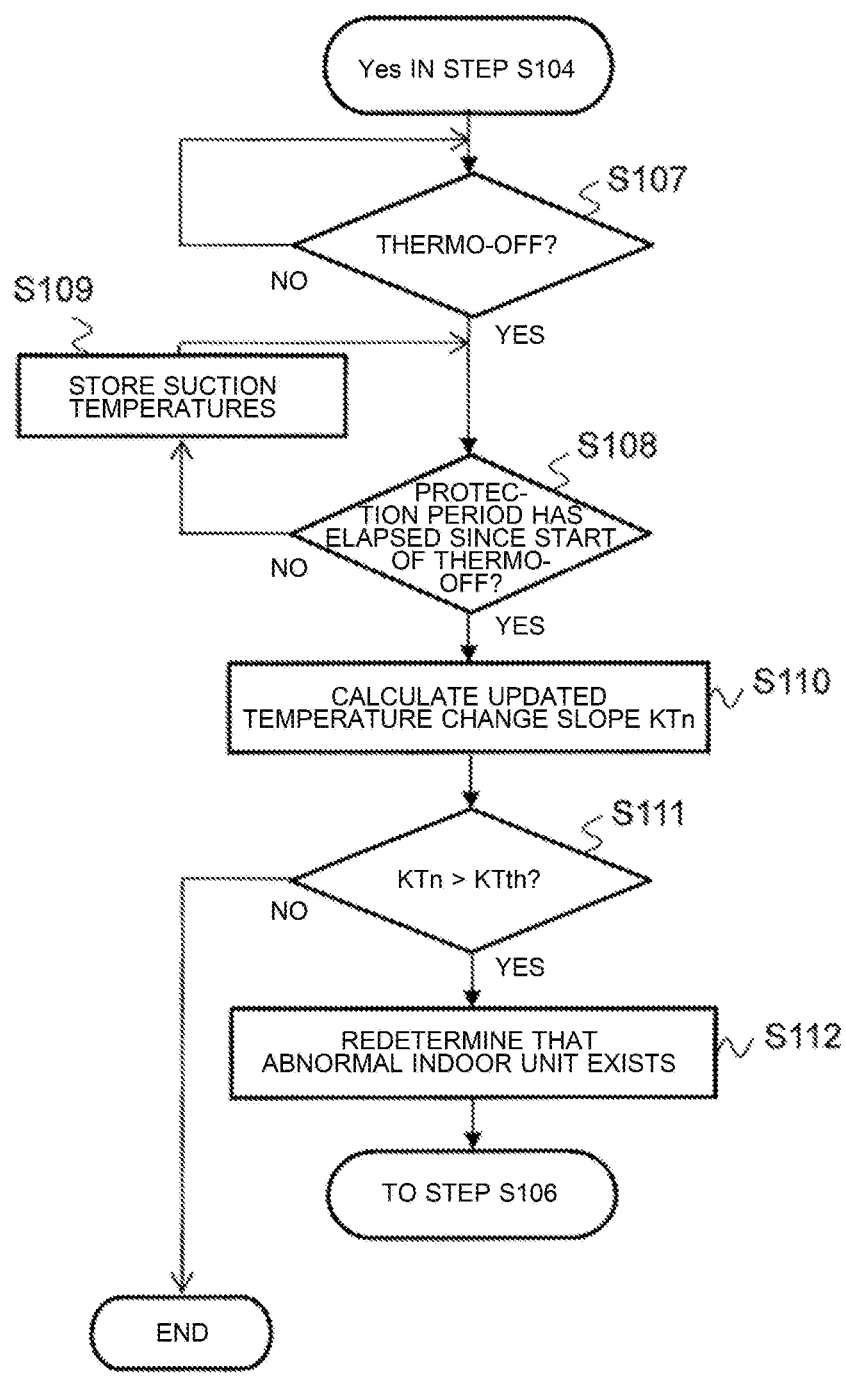
FIG. 10 is a procedure of an example of redetermination that is performed when Yes in step S104 in FIG. 9.

Furthermore, after determining in step S104 in FIG. 9 that there is an abnormal indoor unit, the determination unit 54 may again determine or redetermine an operation condition of the abnormal indoor unit. FIG. 10 illustrates a procedure of an example of redetermination that is performed when Yes in step S104 in FIG. 9. In a case where an abnormal indoor unit in any of the operation conditions D1 and D2 is detected, the determination unit 54 redetermines an operation condition of the abnormal indoor unit on the basis of the individual operation of the abnormal indoor unit in the following manner.

If the suction temperature Tvr falls below the preset temperature Tset after the refrigeration cycle control unit 51 starts the thermo-off state, the thermo-on state will not be started for the protection period for the compressor 21. Accordingly, the suction temperature Tvr will continue to decrease to a temperature close to the actual indoor temperature for the protection period. The determination unit 54 determines whether the refrigeration cycle control unit 51 has started the thermo-off state (step S107). The storage unit 42 stores the suction temperature Tvr of the abnormal indoor unit in time series until the protection period elapses after start of the thermo-off state (steps S108 and S109). The storage unit 42 holds, as a detection value close to the indoor temperature Tr, the suction temperature Tvr at completion of the protection period after the start of the thermo-off state.

The calculation unit 53 calculates an updated temperature change slope KTn, as a temperature change per unit time, by using time-series data on the suction temperatures Tvr detected for the protection period (step S110). Then, the determination unit 54 compares the updated temperature change slope KTn with the determination threshold KTth (step S111). If the updated temperature change slope KTn is greater than the determination threshold KTth, the determination unit 54 redetermines that the abnormal indoor unit is in the abnormal operation condition, and proceeds to step S106 in FIG. 9. If it is determined in step S111 that the updated temperature change slope KTn is less than or equal to the determination threshold KTth, the determination unit 54 determines that the abnormal indoor unit is not in the abnormal operation condition and then terminates the process.

Furthermore, in the procedure of FIG. 10, after the start of the thermo-off state, the determination unit 54 may give an instruction so that the thermo-on state is not started if the suction temperature Tvr falls below the preset temperature Tset, and the storage unit 42 may store the suction temperature Tvr in time series for a predetermined stabilization period. The stabilization period is, for example, 30 minutes. If the stabilization period is longer than the protection period, the storage unit 42 can store a suction temperature Tvr closer to the actual indoor temperature Tr. This leads to improved accuracy of redetermination as to the operation condition of the abnormal indoor unit.

Although Embodiment 1 has been described on the assumption that the indoor units 101 to 103 are indoor units of the ceiling cassette type, the indoor units 101 to 103 may be of a wall-mounted type or a floor-standing type.

The air-conditioning apparatus 1 according to Embodiment 1 includes the indoor units 101 to 103 each individually conditioning the air in the same air-conditioning target space, measures a preset temperature arrival period tp for each of the indoor units, and compares a temperature change slope Kt calculated for each indoor unit with the determination threshold KTth to determine whether there is an abnormal indoor unit.

According to Embodiment 1, a plurality of temperature change slopes calculated for the respective indoor units are compared with the determination threshold, and thereby an abnormal indoor unit in the abnormal operation condition is determined among the indoor units. Air-conditioning control for the abnormal indoor unit can be corrected based on a suction temperature of another indoor unit other than the abnormal indoor unit. Therefore, if the indoor units include an abnormal indoor unit that performs an abnormal operation when affected by itself or another indoor unit, the abnormal operation of the abnormal indoor unit can be suppressed, thus achieving more appropriate air-conditioning in the air-conditioning target space.

In Embodiment 1, the air-conditioning apparatus 1 may calculate an updated temperature change slope of the abnormal indoor unit by using suction temperatures detected for a predetermined period of time after start of the thermo-off state and redetermine, based on the updated temperature change slope and the determination threshold, whether the abnormal indoor unit is in the abnormal operation condition. The predetermined period of time may be the protection period for the compressor 21 or the stabilization period during which the thermo-on state is intentionally prevented from being started after the start of the thermo-off state. This reduces or eliminates the likelihood that a suction temperature of the abnormal indoor unit may be affected by air that is blown by the abnormal indoor unit and is reflected by a wall. Thus, an operation condition of the indoor unit determined as being in the abnormal operation can be redetermined based on a suction temperature Tvr close to the actual indoor temperature Tr.

In addition, according to Embodiment 1, frequent switching between the automatic cooling mode and the automatic heating mode can be suppressed in the automatic cooling/heating switching mode.

Embodiment 2

Embodiment 2 relates to a case where one of two adjacent indoor units installed close to each other is determined as an abnormal indoor unit and whether the abnormal indoor unit is affected by the other indoor unit is determined. An air-conditioning apparatus according to Embodiment 2 has the same configuration as that of the above-described air-conditioning apparatus according to Embodiment 1, and a detailed description of the components described in Embodiment 1 is omitted.

First, the following case in the heating operation will be described. Upon start of the thermo-on state, the indoor temperature Tr sharply increases and the suction temperature Tvr exceeds the preset temperature Tset in a short time, so that the thermo-off state is started. However, the suction temperature Tvr does not decrease, or remains unchanged, even after start of the thermo-off state.

Two operation conditions, an operation condition D3 and an operation condition D4, can be considered as examples of an operation condition exhibiting a temperature characteristic in which the suction temperature remains unchanged even after the start of the thermo-off state. The operation condition D3 is a condition where one of the two indoor units sucks air blown by the other indoor unit and thus enters the thermo-off state but the other indoor unit does not enter the thermo-off state because of differences in, for example, fan air flow rate and refrigeration capacity, between the indoor units. The operation condition D4 is a condition where one of the two indoor units is not affected by the other indoor unit but its suction temperature is high because of, for example, an increase in outdoor air temperature. The operation condition D3 is an incorrect operation condition and the operation condition D4 is a normal operation condition. The air-conditioning apparatus 1 needs to distinguish between these operation conditions.

Figure 11:
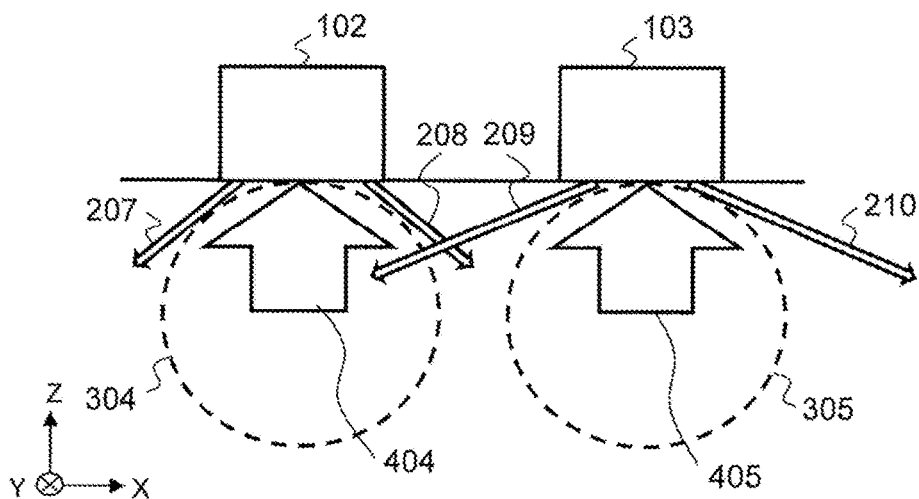
FIG. 11 is a diagram illustrating two indoor units installed close to each other in Embodiment 2 of the present disclosure.
Figure 12:
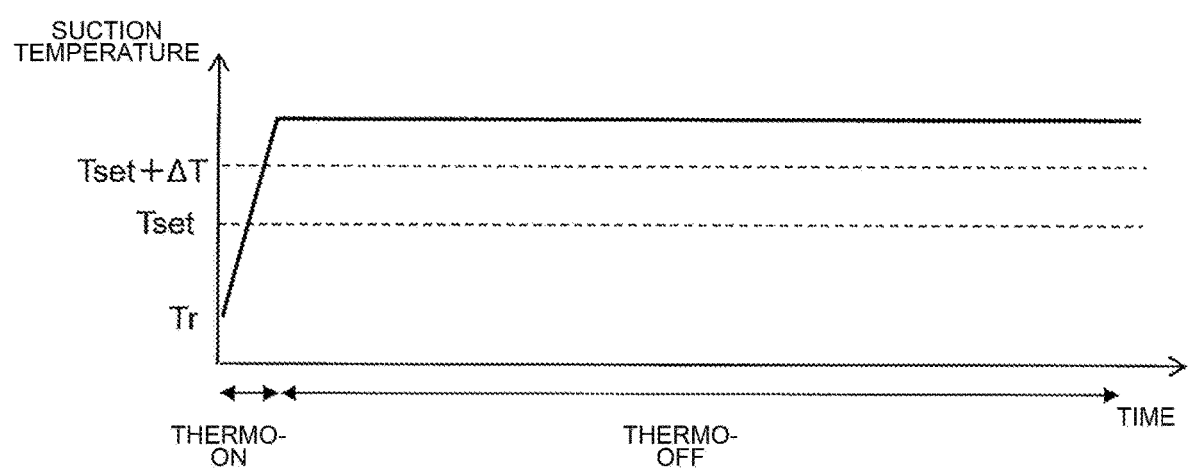
FIG. 12 is a graph showing the relationship between the time and the suction temperature of one of the two indoor units illustrated in FIG. 11 that is affected by the other indoor unit.

FIG. 11 is a diagram illustrating two indoor units installed close to each other in Embodiment 2 of the present disclosure. In the operation condition D3, the indoor units 102 and 103 are installed close to each other. The indoor unit 102 blows air represented as streams 207 and 208. The indoor unit 103 blows air represented as streams 209 and 210. The indoor unit 102 sucks air, as represented by an arrow 404, in a region 304 heated by the air stream 209 blown by the indoor unit 103. The air stream 209 has a high temperature. Consequently, the indoor unit 102, which sucks the air in the region 304, enters the thermo-off state in a short time after start of the thermo-on state. The indoor unit 103 sucks air in a region 305 as represented by an arrow 405. The air in the region 305 is hardly affected by the air stream blown by the indoor unit 102, so that the indoor unit 103 is unlikely to enter the thermo-off state in a short time. Therefore, upon start of the thermo-on state, the suction temperature Tvr of the indoor unit 102 sharply increases and exceeds the preset temperature Tset, so that the indoor unit 102 enters the thermo-off state in a short time. After the indoor unit 102 enters the thermo-off state, the air stream 209 hinders the suction temperature of the indoor unit 102 from decreasing. A graph showing air-conditioning control in the above-described condition is illustrated in FIG. 12. FIG. 12 illustrates the graph showing the relationship between the time and the suction temperature of one of the two indoor units in FIG. 11 that is affected by the other indoor unit.

In the operation condition D4, after the thermo-off state is started in response to the suction temperature Tvr exceeding the preset temperature Tset, the suction temperature Tvr remains unchanged because the actual indoor temperature Tr is higher than the preset temperature Tset.

Figure 13:
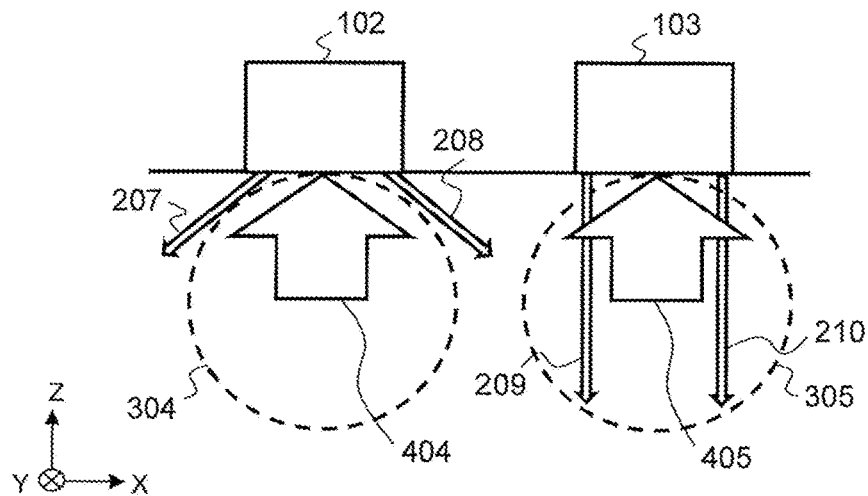
FIG. 13 is a diagram schematically illustrating an operation condition determining method that is performed by a determination unit in Embodiment 2 of the present disclosure.

In Embodiment 2, the determination unit 54 performs the following operation to distinguish between the operation conditions D3 and D4. The operation will be described in detail with reference to FIGS. 16 to 19. FIG. 13 is a diagram schematically illustrating an operation condition determining method that is performed by the determination unit in Embodiment 2 of the present disclosure.

To detect a condition illustrated in FIG. 12, the timer 52 measures the preset temperature arrival period tp it takes for the suction temperature to exceed the preset temperature Tset after start of the thermo-on state. The storage unit 42 stores the suction temperatures Tvr in time series after start of the thermo-off state. The calculation unit 53 calculates the temperature change slope KT by using the preset temperature arrival period tp and time-series data on the suction temperatures Tvr. Upon determining that the temperature change slope KT is greater than the determination threshold KTth and the suction temperature has not decreased after a lapse of a predetermined period of time since the start of the thermo-off state, the determination unit 54 performs the following control to distinguish between the operation conditions D3 and D4.

The determination unit 54 determines an indoor unit in an operation condition illustrated in FIG. 12 as an abnormal indoor unit, and controls the air flow direction adjusting units 15 of all of the other indoor units to shift the air flow direction away from the abnormal indoor unit. For example, as illustrated in FIG. 13, the determination unit 54 temporarily causes all of the other indoor units to blow air downward (in a direction opposite to that of a Z-axis arrow). As illustrated in FIG. 13, when the indoor unit 103 downwardly blows air represented as the air streams 209 and 210, the air in the region 304 is hardly affected by the air stream 209. Thus, the indoor unit 102 can determine a suction temperature Tvr that is little affected by warm air blown by another indoor unit, or the indoor unit 103.

Figure 14:
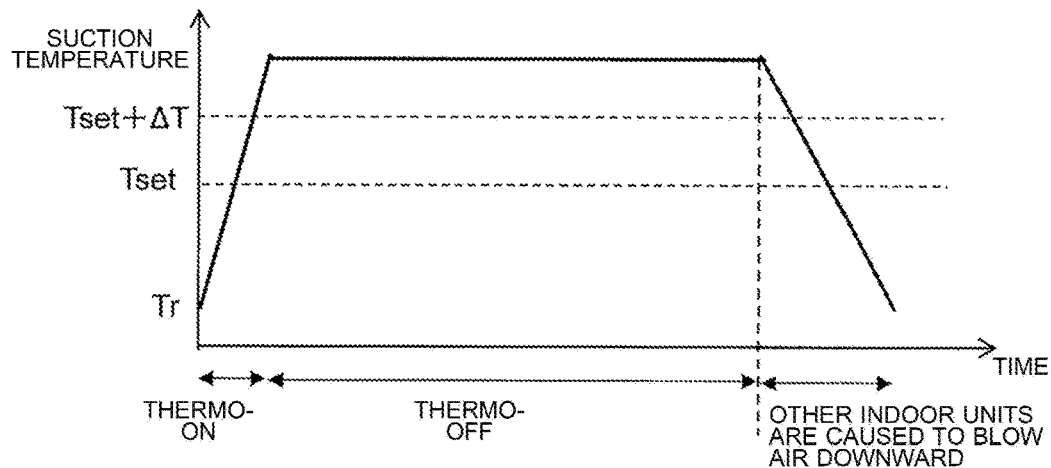
FIG. 14 is a graph showing the relationship between the time and the suction temperature of one of the two indoor units that is in an abnormal operation due to an effect of the other indoor unit.
Figure 15:
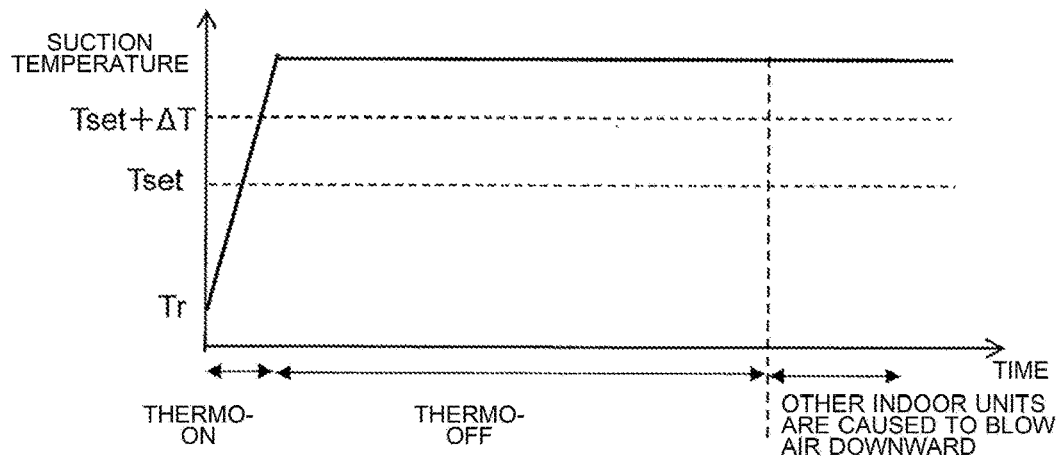
FIG. 15 is a graph showing the relationship between the time and the suction temperature of one of the two indoor units that is in an abnormal operation due to a cause different from an effect of the other indoor unit.

FIG. 14 is a graph showing the relationship between the time and the suction temperature of one of the two indoor units that is in an abnormal operation due to an effect of the other indoor unit. FIG. 15 is a graph showing the relationship between the time and the suction temperature of one of the two indoor units that is in an abnormal operation due to a cause different from an effect of the other indoor unit.

As a result of the above-described control, in a case where the suction temperature Tvr of the abnormal indoor unit decreases as illustrated in FIG. 14, the determination unit 54 determines that an operation condition of the abnormal indoor unit is the operation condition D3. As a result of the above-described control, in a case where the suction temperature Tvr remains unchanged as illustrated in FIG. 15, the determination unit 54 determines that the suction temperature is not affected by air streams from the other indoor units and thus determines that an operation condition of the abnormal indoor unit is the operation condition D4, or the normal condition. Upon determining that the operation condition of the abnormal indoor unit is the operation condition D3, the determination unit 54 controls each of the air flow direction adjusting units 15 of all of the other indoor units to return the air flow direction to its original direction. This control is illustrated in steps S301 to S305 in FIG. 17. This control causes each of the indoor units blowing air downward to return the air flow direction to its original direction. Although the control in the heating operation has been described as an example, the control can be similarly performed in the cooling operation.

Control in a case where the determination unit 54 determining that there is an indoor unit in the operation condition D3 causes the indoor units 101 to 103 to individually operate and corrects air-conditioning control will now be described. The control described below corresponds to step S306 in FIG. 17 and steps S601 to S608 in FIG. 19. These steps will be described later.

The storage unit 42 stores the suction temperature Tvr of the abnormal indoor unit as a detection value representing a correct indoor temperature Tr while the indoor units other than the abnormal indoor unit are blowing air downward. The refrigeration cycle control unit 51 uses the suction temperatures of the abnormal indoor unit, stored by the storage unit 42 while the indoor units other than the abnormal indoor unit are blowing the air downward, to determine whether to start the thermo-on state or the thermo-off state. The determination unit 54 causes the indoor units other than the abnormal indoor unit to blow the air downward for a predetermined period of time, during which the storage unit 42 stores the suction temperatures Tvr of the abnormal indoor unit as correct indoor temperatures Tr. The period of time is, for example, 30 minutes.

Once the determination unit 54 determines that the abnormal indoor unit is in the operation condition D3, the determination unit 54 controls the other indoor units such that the other indoor units blow air downward for the predetermined period of time, thus updating suction temperatures of the abnormal indoor unit to be stored in the storage unit 42. Thus, a change in the suction temperature Tvr of the abnormal indoor unit over time can be monitored as a correct change in the indoor temperature Tr. After that, in a case where a temporal change in the suction temperature Tvr of the indoor unit determined as being in the operation condition D3 exhibits a distinctive relationship in the operation condition D3, the determination unit 54 continues the above-described control. In this case, if there is an abnormal indoor unit, multiple indoor units can be operated individually without collective control based on a parent unit designated. If the parent unit enters an abnormal operation condition because of an environmental change, collective control will fail to appropriately condition air in the indoor space. As described above, continuing the individual operations of the multiple indoor units can prevent inappropriate air-conditioning even if the parent unit enters an abnormal operation condition.

An operation of the air-conditioning apparatus 1 according to Embodiment 2 will now be described. FIGS. 16 to 19 are flowcharts illustrating an operation procedure of the air-conditioning apparatus according to Embodiment 2 of the present disclosure. FIGS. 16 to 19 include the control described in Embodiment 1. In the following description, it is assumed that the air-conditioning apparatus 1 performs the heating operation.

The refrigeration cycle control unit 51 compares the suction temperature Tvr with the upper preset temperature (step S202) after start of the thermo-on state (step S201). If the suction temperature Tvr is greater than the upper preset temperature, the refrigeration cycle control unit 51 starts the thermo-off state (step S203). After start of the thermo-off state, as described in Embodiment 1, the determination unit 54 compares the temperature change slope KT with the determination threshold KTth (step S204). If each temperature change slope KT is less than or equal to the determination threshold KTth, the determination unit 54 determines that there is no abnormal indoor unit. Then, the refrigeration cycle control unit 51 compares the suction temperature Tvr with the lower preset temperature (step S205). If the suction temperature Tvr is less than the lower preset temperature, the refrigeration cycle control unit 51 determines whether the protection period has elapsed since the start of the thermo-off state (step S206). If the protection period has elapsed, the refrigeration cycle control unit 51 returns to step S201, where the refrigeration cycle control unit 51 starts the thermo-on state.

If it is determined in step S204 that the temperature change slope KT is greater than the determination threshold KTth, the determination unit 54 compares the suction temperature Tvr with the lower preset temperature (step S207). If the suction temperature Tvr is less than the lower preset temperature, the determination unit 54 determines that there is an abnormal indoor unit (step S208). Then, the determination unit 54 determines whether the protection period has elapsed since the start of the thermo-off state (step S209). If the protection period has elapsed, the determination unit 54 determines whether parent unit control is set (step S210). If parent unit control is set, the determination unit 54 proceeds to step S401 in FIG. 18.

Figure 17:
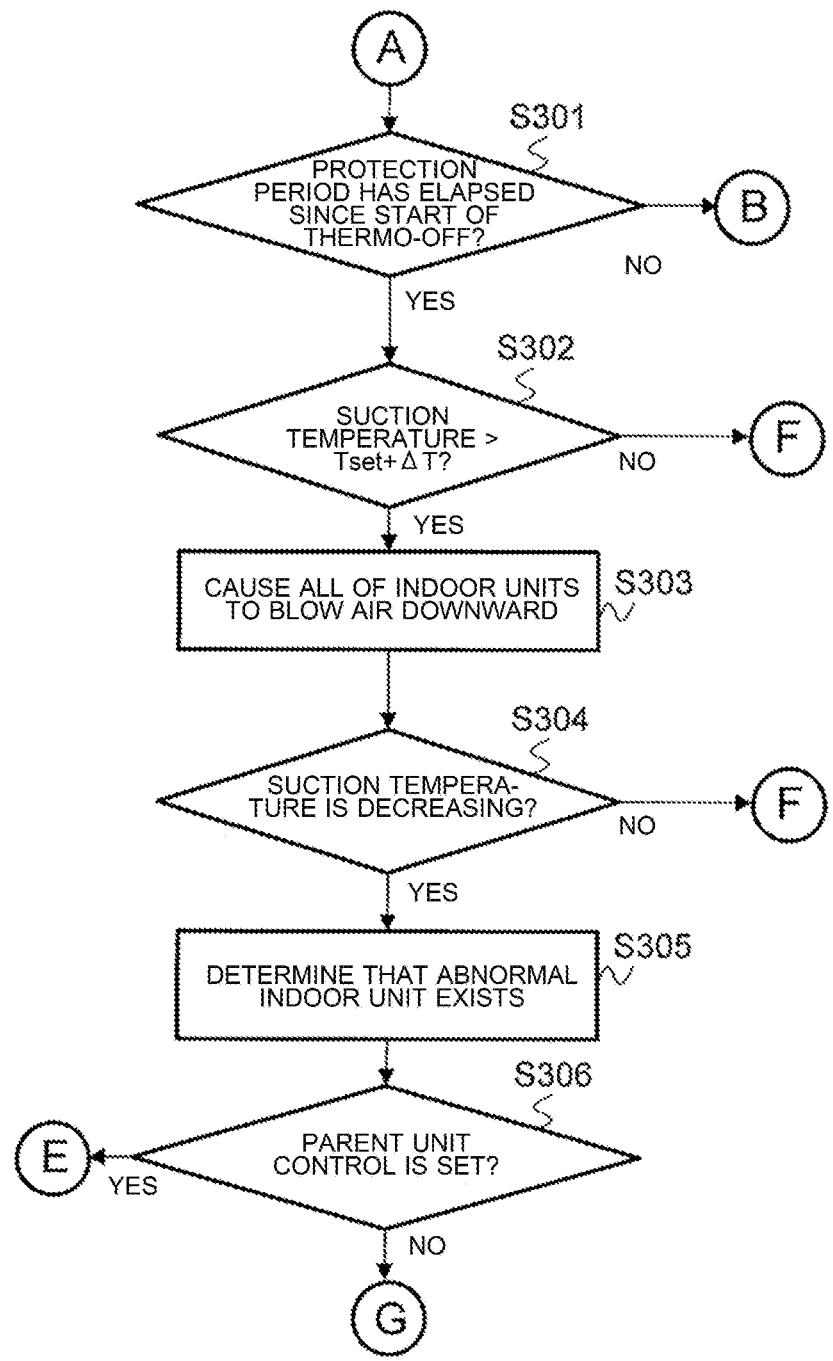
FIG. 17 is a flowchart illustrating the operation procedure of the air-conditioning apparatus according to Embodiment 2 of the present disclosure.

If it is determined in step S207 that the suction temperature Tvr is greater than or equal to the lower preset temperature, the determination unit 54 proceeds to step S301 in FIG. 17. Furthermore, if it is determined in step S209 that the protection period has not elapsed since the start of the thermo-off state, the process returns to step S203, where the refrigeration cycle control unit 51 maintains the thermo-off state.

In step S301 in FIG. 17, the determination unit 54 determines whether the protection period has elapsed since the start of the thermo-off state (step S301). If the protection period has elapsed, the determination unit 54 compares the suction temperature Tvr with the upper preset temperature (step S302). If the suction temperature Tvr is greater than the upper preset temperature, the determination unit 54 controls all of the indoor units such that the indoor units blow air downward (step S303). The determination unit 54 determines whether there is an indoor unit decreasing in the suction temperature Tvr (step S304), and then determines the indoor unit decreasing in the suction temperature Tvr as an abnormal indoor unit (step S305). Subsequently, the determination unit 54 determines whether parent unit control is set (step S306). If the parent unit control is set, the process proceeds to step S501 in FIG. 18.

Figure 16:
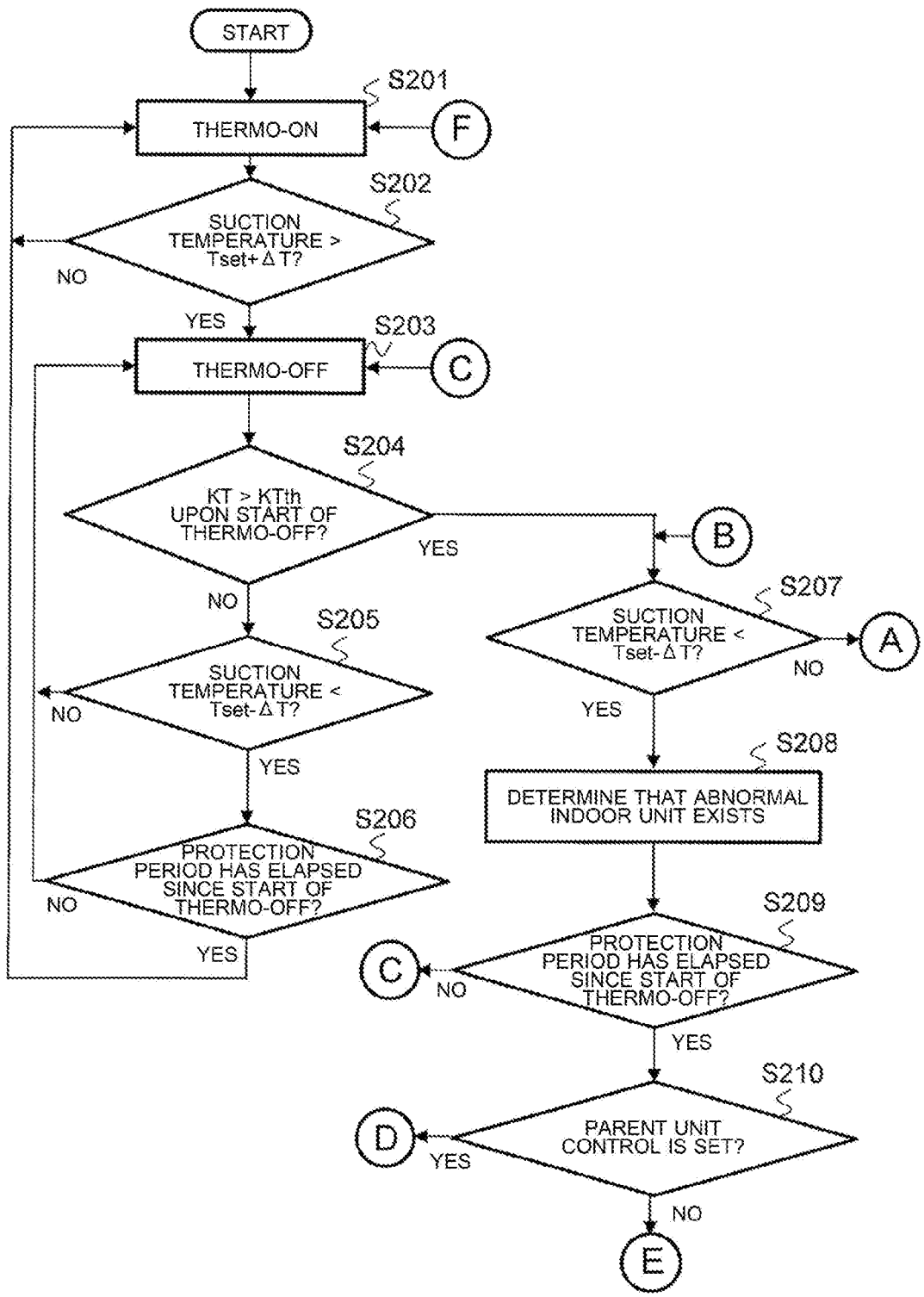
FIG. 16 is a flowchart illustrating an operation procedure of an air-conditioning apparatus according to Embodiment 2 of the present disclosure.

Upon determining in step S301 that the protection period has not elapsed, the determination unit 54 returns to step S207 in FIG. 16. Upon determining in step S302 that the suction temperature Tvr is less than or equal to the upper preset temperature, the determination unit 54 returns to step S201 in FIG. 16. Upon determining in step S304 that there is no indoor unit decreasing in the suction temperature Tvr, the determination unit 54 returns to step S201 in FIG. 16. Upon determining in step S306 that the parent unit control is not set, the determination unit 54 proceeds to step S601 in FIG. 19.

Figure 18:
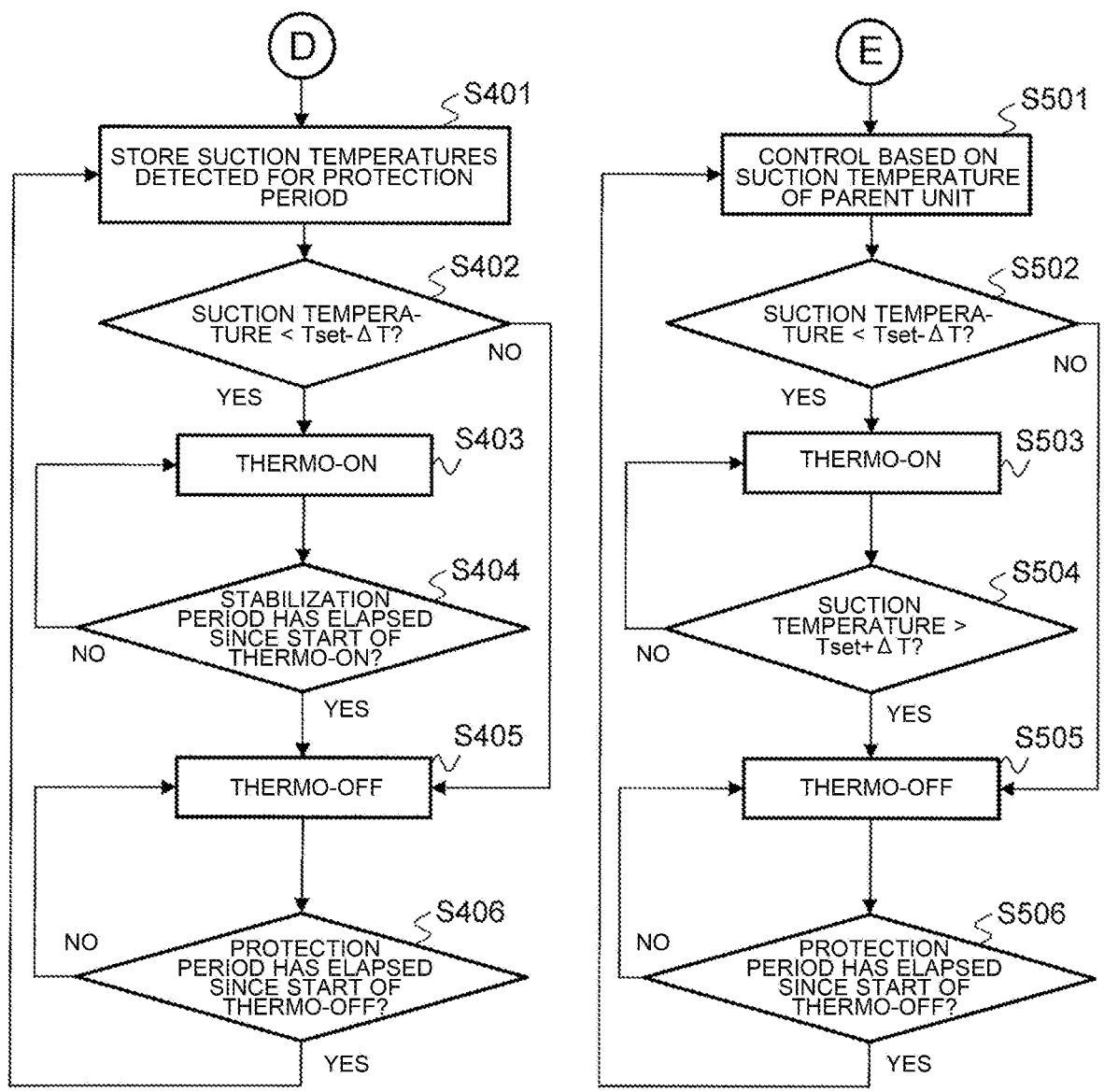
FIG. 18 is a flowchart illustrating the operation procedure of the air-conditioning apparatus according to Embodiment 2 of the present disclosure.

In step S401 in FIG. 18, the storage unit 42 stores the suction temperatures Tvr in time series for the protection period (step S401). The refrigeration cycle control unit 51 compares the suction temperature Tvr with the lower preset temperature (step S402). If the suction temperature Tvr is less than the lower preset temperature, the refrigeration cycle control unit 51 starts the thermo-on state (step S403). The refrigeration cycle control unit 51 determines whether the stabilization period has elapsed since start of the thermo-on state (step S404). If the stabilization period has elapsed since the start of the thermo-on state, the refrigeration cycle control unit 51 starts the thermo-off state (step S405). After that, the refrigeration cycle control unit 51 determines whether the protection period has elapsed since start of the thermo-off state (step S406). If the protection period has elapsed, the process returns to step S401.

In step S501 in FIG. 18, the auxiliary control unit 55 designates a parent unit in the manner described in Embodiment 1 and instructs the refrigeration cycle control unit 51 to control air-conditioning based on the suction temperature Tvr of the parent unit (step S501). The refrigeration cycle control unit 51 compares the suction temperature Tvr with the lower preset temperature (step S502). If the suction temperature Tvr is less than the lower preset temperature, the refrigeration cycle control unit 51 starts the thermo-on state (step S503). Subsequently, the refrigeration cycle control unit 51 compares the suction temperature Tvr with the upper preset temperature (step S504). If the suction temperature Tvr is greater than the upper preset temperature, the refrigeration cycle control unit 51 starts the thermo-off state (step S505). After that, the refrigeration cycle control unit 51 determines whether the protection period has elapsed since start of the thermo-off state (step S506). If the protection period has elapsed, the process returns to step S501.

Figure 19:
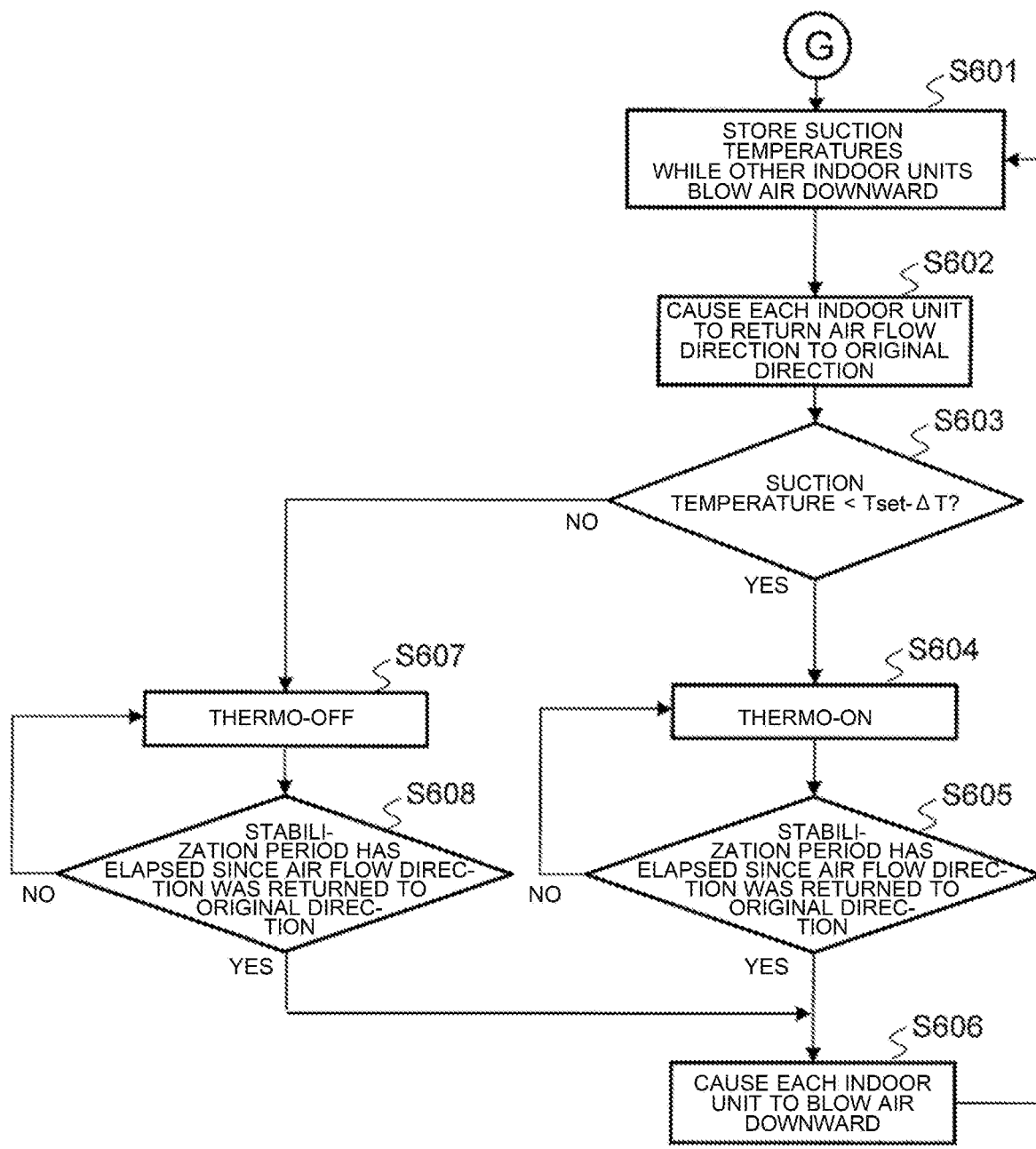
FIG. 19 is a flowchart illustrating the operation procedure of the air-conditioning apparatus according to Embodiment 2 of the present disclosure.

In step S601 in FIG. 19, the storage unit 42 stores the suction temperatures Tvr of the abnormal indoor unit in time series while the indoor units other than the abnormal indoor unit are blowing air downward (step S601). After that, the determination unit 54 causes each of the indoor units to return the air flow direction to its original direction (step S602). The refrigeration cycle control unit 51 compares the suction temperature Tvr with the lower preset temperature (step S603). If the suction temperature Tvr is less than the lower preset temperature, the refrigeration cycle control unit 51 starts the thermo-on state (step S604). After start of the thermo-on state, the determination unit 54 determines whether the stabilization period has elapsed since the air flow direction of each of the indoor units was returned to its original direction (step S605). If the stabilization period has elapsed, the determination unit 54 causes each of the indoor units to blow air downward (step S606). The process returns to step S601. Upon determining in step S603 that the suction temperature Tvr is greater than or equal to the lower preset temperature, the refrigeration cycle control unit 51 starts the thermo-off state (step S607). Subsequently, the determination unit 54 determines whether the stabilization period has elapsed since the air flow direction of each of the indoor units was returned to its original direction (step S608). If the stabilization period has elapsed, the process proceeds to step S606.

The determination unit 54 determines whether switching between the thermo-on state and the thermo-off state is normal in the manner illustrated in steps S301 to S305 in FIG. 17, so that whether the operation condition of an abnormal indoor unit is the operation condition D3 or the operation condition D4 can be determined. If the abnormal indoor unit is in the operation condition D3, the air-conditioning apparatus 1 may perform the parent unit control illustrated in steps S501 to S506 or may continue the individual operations illustrated in steps S601 to S608.

In the air-conditioning apparatus 1 according to Embodiment 2, in response to a determination that there is an abnormal indoor unit, the air flow direction adjusting units 15 of the indoor units other than the abnormal indoor unit are controlled to shift the air flow direction away from the abnormal indoor unit. Whether switching between the thermo-on state and the thermo-off state is normal is determined based on a change in the suction temperature of the abnormal indoor unit. According to Embodiment 2, whether the abnormal indoor unit is in the operation condition D3 or the operation condition D4 can be determined in addition to the same advantageous effects as those in Embodiment 1.

Additionally, in the air-conditioning apparatus 1 according to Embodiment 2, if there is an abnormal indoor unit that is affected by another indoor unit, the suction temperature Tvr of the abnormal indoor unit can be measured such that the suction temperature Tvr is closer to the actual indoor temperature Tr, and the individual operations of the multiple indoor units can be continued.

The invention claimed is:

1. An air-conditioning apparatus comprising:
a plurality of indoor units each including a suction temperature sensor detecting a suction temperature that is a temperature of air sucked from an air-conditioning target space into the indoor unit, in which the suction temperature sensor is included, the plurality of indoor units each individually conditioning the air in the air-conditioning target space by using the suction temperature and a preset temperature;
a controller including:
a memory storing detection values of the plurality of suction temperature sensors in time series and
a timer measuring, for each of the plurality of indoor units, a preset temperature arrival period it takes for the suction temperature to reach the preset temperature for the air conditioning target space after start of a thermo-on state or a thermo-off state;
the controller calculating, for each of the plurality of indoor units, a temperature change slope representing a change in the suction temperature for the preset temperature arrival period; and
the controller comparing the temperature change slope of each of the plurality of indoor units with a determination threshold to determine, as an abnormal indoor unit, the indoor unit having the temperature change slope greater than the determination threshold;
wherein the controller designates one of the plurality of indoor units as a parent unit, designates remaining indoor units of the plurality of indoor units as child units, and controls operations of all of the plurality of indoor units by using the suction temperature of the parent unit; and
wherein when the controller determines that that the abnormal indoor unit exists, the controller designates, as the parent unit, one of the plurality of indoor units other than the indoor unit determined as the abnormal indoor unit.

2. The air-conditioning apparatus of claim 1,
wherein when the controller determines that that the abnormal indoor unit exists, the controller calculates an updated temperature change slope by using the suction temperatures that are detected for a predetermined period of time after start of the thermo-off state of the abnormal indoor unit, and
wherein the controller determines, based on the updated temperature change slope and the determination threshold, whether the abnormal indoor unit is in an abnormal operation condition.

3. The air-conditioning apparatus of claim 1,
wherein the plurality of indoor units each include an air flow direction adjusting unit adjusting an air flow direction in which the air is blown into the air-conditioning target space,
wherein when determining that the abnormal indoor unit exists, the controller controls the air flow direction adjusting units of the plurality of indoor units other than the abnormal indoor unit to shift the air flow direction away from the abnormal indoor unit,
wherein the controller calculates an updated temperature change slope by using the suction temperatures that are detected at the abnormal indoor unit after the controller controls the air flow direction adjusting units, and
wherein the controller again determines, based on the updated temperature change slope and the determination threshold, whether the abnormal indoor unit is in an abnormal operation condition.

4. The air-conditioning apparatus of claim 1,
wherein the plurality of indoor units each include an air flow direction adjusting unit adjusting an air flow direction in which the air is blown into the air-conditioning target space,
wherein when determining that the abnormal indoor unit exists, the controller determines whether the suction temperature changes upon switching from the thermo-off state to the thermo-on state of the abnormal indoor unit, and
wherein when determining that the suction temperature remains unchanged, the controller controls the air flow direction adjusting units of the plurality of indoor units other than the abnormal indoor unit to shift the air flow direction away from the abnormal indoor unit, and determines, based on a change in the suction temperature of the abnormal indoor unit, whether switching between the thermo-on state and the thermo-off state is normal.

5. The air-conditioning apparatus of claim 1, wherein the controller designates the indoor unit with the lowest suction temperature as the parent unit in heating the air-conditioning target space, and designates the indoor unit with the highest suction temperature as the parent unit in cooling the air-conditioning target space.

6. A method of determining an operation condition, the method being performed by an air-conditioning apparatus including a plurality of indoor units and a memory, the plurality of indoor units each including a suction temperature sensor detecting a suction temperature that is a temperature of air sucked into the indoor unit from an air-conditioning target space, the plurality of indoor units each individually conditioning the air in the air-conditioning target space by using the suction temperature and a preset temperature, the method comprising:

storing detection values of the suction temperature sensors in time series in the memory:

measuring, for each of the plurality of indoor units, a preset temperature arrival period it takes for the suction temperature to reach the preset temperature for the air-conditioning target space after start of a thermo-on state or a thermo-off state;

calculating, for each of the plurality of indoor units, a temperature change slope representing a change in the suction temperature for the preset temperature arrival period; and comparing the temperature change slope of each of the plurality of indoor units with a determination threshold to determine, as an abnormal indoor unit, the indoor unit having the temperature change slope greater than the determination threshold, wherein the controller designates one of the plurality of indoor units as a parent unit, designates remaining indoor units of the plurality of indoor units as child units, and controls operations of all of the plurality of indoor units by using the suction temperature of the parent unit; and wherein when the controller determines that that the abnormal indoor unit exists, the controller designates, as the parent unit, one of the plurality of indoor units other than the indoor unit determined as the abnormal indoor unit.

* * * * *